(No Model.)
G. W. LOVE.
COMBINED STRAWBERRY VINE CUTTER AND CULTIVATOR.
No. 396,098. Patented Jan. 15, 1889.
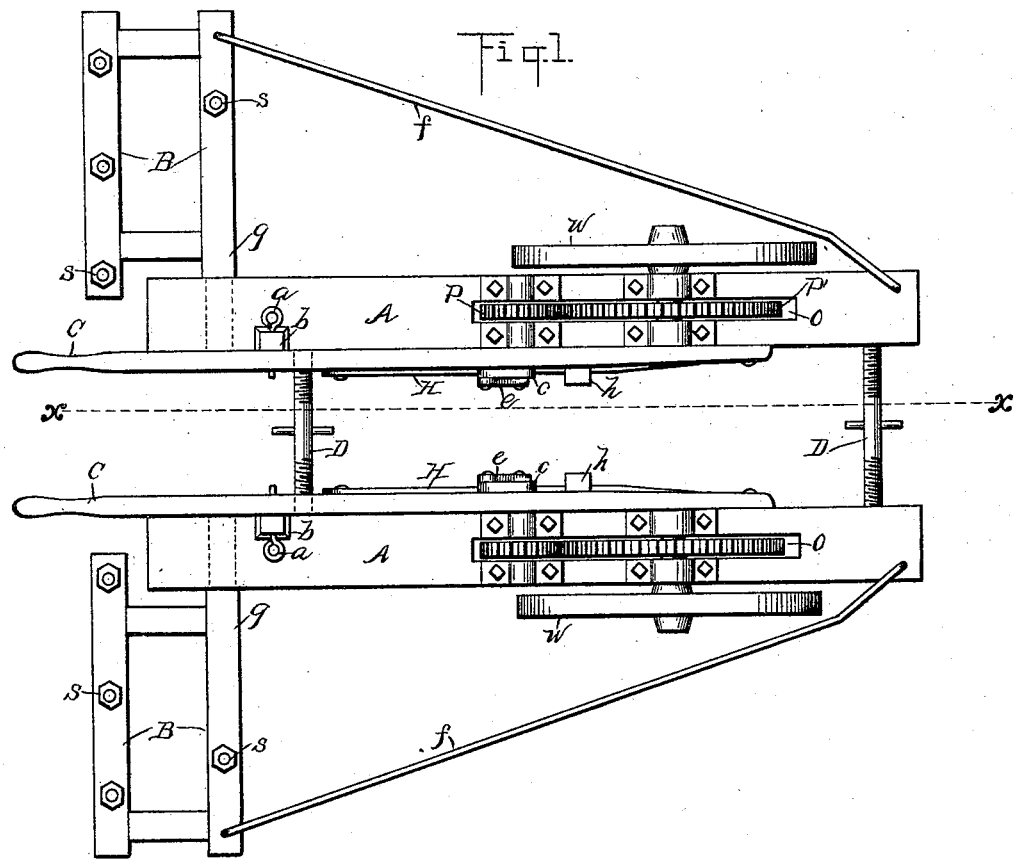
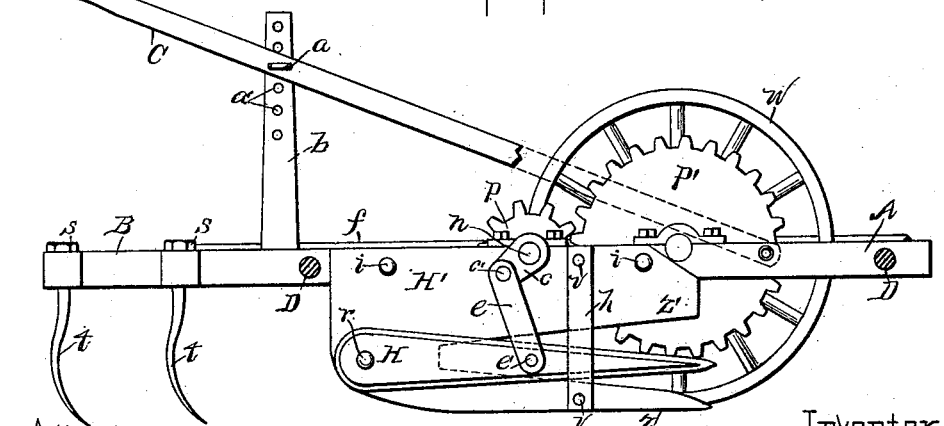
Attest.
Inventor.

UNITED STATES PATENT OFFICE.

GEORGE W. LOVE, OF GRAYLING, MICHIGAN.

COMBINED STRAWBERRY-VINE CUTTER AND CULTIVATOR.

SPECIFICATION forming part of Letters Patent No. 396,098, dated January 15, 1889.

Application filed March 21, 1888. Serial No. 267,995. (No model.)

*To all whom it may concern:*

Be it known that I, GEORGE W. LOVE, a citizen of the United States, residing at Grayling, in the county of Crawford and State of Michigan, have invented certain new and useful Improvements in a Combined Strawberry Runner Cutter and Cultivator; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for cutting the runners of strawberry-vines and cultivating the same.

The object of my invention is to construct a machine for cutting the runners of strawberry-vines, that the runners on both sides of a row of plants may be cut at the same time; that the machine may be readily adjusted to the various widths of the rows of plants, and also to cultivate the soil on both sides or between the rows as the runners are cut from the vines.

The invention consists of a suitable two-part frame which is adjustably connected by means of right and left hand screws. Each of the parts of the frame is provided with a shaft carrying a transporting-wheel and drive-pinion, which pinion meshes with a smaller pinion on a shaft journaled in the frame and carrying at one end a crank-arm with pitman connecting said arm to a double-edged cutting-blade, said cutting-blade having its rear end pivoted to a forked metal knife or cutting-blade secured by bolts to the inner face of the rail of the frame. The lower pointed end of the forked plate is adapted to raise the runners from the ground as the machine advances, while the free end of the double-edged cutting-blade will be reciprocated by the crank-arm and pitman and sever the runners from the vines. Journaled to the rear end of the two-part frame are two small frames carrying a series of depending teeth, which enter the soil on both sides of the row and act as cultivators. Suitable handles are attached to the inner faces of the rails of the frame, by which the machine may be guided, and is to be drawn by one or more horses, all of which will be hereinafter more fully set forth and claimed, reference being had to the accompanying drawings, in which—

Figure 1 is a top plan of the complete machine embodying my invention. Fig. 2 is a side elevation, partly in section, on dotted line $x$ $x$ of Fig. 1.

In the drawings, A represents the rails forming the two-part frame. D shows two rods having right and left hand screw-threads, the ends of which enter the inner edges of the rails A at or near each end, and by revolving said rods the frame of the machine may be expanded or contracted to suit the varying widths of the rows of plants. (See Fig. 1.)

W represents the transporting-wheels, which are secured rigidly to the outer ends of the shafts F. Said shafts are journaled in suitable boxes in the rails A of the frame, and carry at their centers and within the opening O of said rails A the drive-pinions P′. Said pinion P′ meshes with a smaller pinion, P, mounted on the shaft $n$, which shaft is also journaled in suitable boxes in the frame and carries at its inner end the crank-arm $c$, having a wrist-pin, $c'$, to which one end of the pitman $e$ is attached, the other end of said pitman being pivotally attached by means of the pin $e'$ to the double-edged cutting-blade H at or near its center. The rear end of the blade H is pivotally attached by the bolt $r$ to the rear lower portion of the forked metal plate H′. Said plate H′ is secured to the inner edges of the rails A of the frame, and has a guide and strengthening strap or brace $h$, which extends across the opening or slotted portion of the plate H′, having its ends secured thereto by screws or bolts, as $v$, whereby said strap $h$ forms a brace or support for the lower portion, Z, of said plate H′, and also a guide for the cutting-blade H, preventing it from drawing away from the forked or cutting edges Z Z′ of the plate H′, as shown clearly in Fig. 2.

B B represent two frames, having secured to their main rails by means of nuts $s$ the series of downwardly-projecting teeth $t$. One end of each rail $g$ of the frame B is journaled in the rear end of the rail A of the frame, as shown by dotted lines in Fig. 1, and f shows a brace-rod extending from the other or outer end of the rail g of the frame B to the forward end of the rail A of the frame, its end entering holes formed vertically in said rails.

The object of journaling the drags or harrows B to the main frame A and attaching the rods f thereto, as specified, is to impart to the harrows a vibrating motion as the teeth pass through the soil, the rod f acting as a spring and serving to support the free or outer ends of the harrow-frames. (See Fig. 1.)

C C represent two handles or arms having their forward ends attached to the forward portion of the rails A of the frame, their rear or handled ends extending back on an incline, and may be adjusted to suit the height of the operator by passing the screw-eye a through said handle and one of the series of holes a' of the upright b of the frame A.

It will be observed from the foregoing construction of parts that as the machine is advanced over a row of strawberry-plants the transporting-wheels W, driving the pinion P'', which meshes with the pinion P, will cause said pinion to revolve, and by the crank-arm and pitman e, connecting the shaft n of the pinion P with the double-edged cutting-blade H, said blade will be caused to reciprocate across the forked portion of the plate H', and as both edges of the fork of the plate H' are cutting-edges the runners of the plants, which enter said fork either above or below the cutting-blade H, will by the blade H and cutting-edges Z Z' of the forked plate H' be severed from their vines or plants, and the drags or harrows attached to the rear of the machine serve to cultivate the soil on both sides of the row, and also to gather up the cut weeds and runners.

When transporting the machine from place to place, if desired, the ends of the rods f may be disengaged from the rails g of the frames B, when the harrows may be swung up to prevent the teeth t from entering the soil, and may be held in such position (which position is not shown) by hooking the bent portions (not shown) of the rods f over the upper rails of the frames B.

Having thus fully set forth my invention, what I claim as new, and desire to secure by Letters Patent, is—

1. In combination with the frame A, the transporting-wheel, the stationary forked cutting-blade H', the double-edged cutting-blade H, the pinions and intermediate parts coupling the pinions to the double-edged cutting-blade, and handles attached to the rails of the two-part frame, as and for the purposes specified.

2. In a device for the purposes specified, the combination of the frames A, the rods D for adjusting said frames, the transporting-wheels, the pinions mounted on said frames, the forked cutting-blades H', the double-edged cutting-blades H, the mechanism coupling the blades H to the pinions P, the cultivators attached to the frame A, and handles for guiding the machine, as and for the purposes specified.

In testimony whereof I affix my signature in presence of two witnesses.

GEORGE W. LOVE.

Witnesses:
O. J. BELL,
FRANK A. BELL.